United States Patent
Cepuran

(10) Patent No.: US 8,644,889 B2
(45) Date of Patent: Feb. 4, 2014

(54) RESTORING CONNECTIVITY TO A DESUBSCRIBED TELEMATICS UNIT

(75) Inventor: Lawrence D. Cepuran, Northville, MI (US)

(73) Assignee: General Motors, LLC., Detroit, MI (US)

(*) Notice: Subject to any disclaimer, the term of this patent is extended or adjusted under 35 U.S.C. 154(b) by 872 days.

(21) Appl. No.: 12/411,973

(22) Filed: Mar. 26, 2009

(65) Prior Publication Data

US 2010/0248695 A1  Sep. 30, 2010

(51) Int. Cl.
*H04M 1/00* (2006.01)

(52) U.S. Cl.
USPC .............. 455/569.2; 455/414.1; 455/41.2; 455/426.1; 370/216; 713/151

(58) Field of Classification Search
USPC ........ 455/569.2, 414.1, 41.2, 426.1; 370/216; 713/151
See application file for complete search history.

(56) References Cited

U.S. PATENT DOCUMENTS

| | | | |
|---|---|---|---|
| 7,366,892 B2* | 4/2008 | Spaur et al. | 713/151 |
| 7,844,282 B1* | 11/2010 | Tendler | 455/456.2 |
| 2004/0203767 A1* | 10/2004 | Fraser et al. | 455/435.1 |
| 2006/0003762 A1* | 1/2006 | Sumcad et al. | 455/428 |
| 2006/0079203 A1* | 4/2006 | Nicolini | 455/411 |
| 2006/0166631 A1* | 7/2006 | Ross et al. | 455/152.1 |
| 2007/0167147 A1* | 7/2007 | Krasner et al. | 455/404.2 |
| 2007/0277193 A1* | 11/2007 | Mannikka et al. | 725/34 |
| 2009/0036091 A1* | 2/2009 | Ball et al. | 455/404.1 |
| 2009/0197593 A1* | 8/2009 | Farrell et al. | 455/426.1 |

* cited by examiner

*Primary Examiner* — Jean Gelin
*Assistant Examiner* — Qun Shen
(74) *Attorney, Agent, or Firm* — Leydig, Voit & Mayer, Ltd.

(57) ABSTRACT

Aspects of the invention include a method and system for restoring connectivity from a telematics service provider to a desubscribed telematics unit, and therefore, restored a capability of providing telematics services to a vehicle owner. A vehicle owner with a lapsed subscription and a desubscribed telematics unit installed in his vehicle may have the need to request certain telematics services from the telematics service provider. Aspects of the invention provide for a vehicle owner with a lapsed subscription and a desubscribed telematics unit to request certain "a la carte" services from a telematics service provider using the vehicle owner's personal cellular telephone connected to the desubscribed telematics unit across a personal wireless link.

12 Claims, 4 Drawing Sheets

RESTORING CONNECTIVITY TO A DESUBSCRIBED TELEMATICS UNIT

FIELD OF THE INVENTION

The present invention relates generally to providing telematics services to a vehicle owner having a telematics unit installed in a vehicle, and in particular to a method and system for restoring connectivity to a desubscribed telematics unit.

BACKGROUND OF THE INVENTION

A telematics service subscriber is a vehicle owner (the term "owner" also includes users) with a telematics unit installed in his or her vehicle. An active telematics service subscription allows the vehicle owner to utilize telematics services from a telematics service provider through the telematics unit. Many times, a vehicle owner's subscription lapses, and the vehicle owner's telematics unit is consequently desubscribed from the telematics service provider system. After desubscription, the desubscribed telematics unit and the vehicle owner do not receive any further services from the telematics service provider.

However, it is sometimes desirable to restore connectivity to a desubscribed user. For example, it may be that the desubscription occurred in error, or was responsive to a condition, such as nonpayment or other issue, that has since been resolved. At any rate, when it becomes necessary or desirable to restore such connectivity, the inventors have observed that present systems do not allow seamless and efficient restoration.

BRIEF SUMMARY OF THE INVENTION

Aspects of the invention include a method and system for restoring connectivity from a telematics service provider to a desubscribed telematics unit and, therefore, restoring the ability to provide telematics services to a vehicle owner. As described herein, the telematics unit contains a cellular telephone which is used by the telematics service provider to deliver telematics services to the vehicle owner across a wireless communication network. The cellular telephone is assigned a Mobile Identification Number (MIN) that enables it to communicate with the telematics service provider. However, after a vehicle owner's telematics service subscription lapses, the telematics service provider desubscribes the vehicle owner's telematics unit by deactivating the MIN of the telematics unit. This is because maintaining an active MIN in every desubscribed telematics unit, across many vehicles, would burden the telematics service provider and/or its wireless service provider with continued operation costs. Thus, deactivating the MIN in a desubscribed telematics unit reduces operation costs.

Thereafter, a vehicle owner with a lapsed subscription and a desubscribed telematics unit installed in his vehicle may have the need to request certain telematics services from the telematics service provider. Exemplary requested services may include emergency unlocking of the vehicle door after misplacing the vehicle keys, dispatching emergency personnel to the vehicle location after being involved in an accident, or requesting turn-by-turn directions after being lost. Aspects of the invention provide for a vehicle owner with a lapsed telematics services subscription and a desubscribed telematics unit in his vehicle to request certain "a la carte" services from a telematics service provider using the vehicle owner's personal cellular telephone connected to the desubscribed telematics unit across a personal wireless link.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
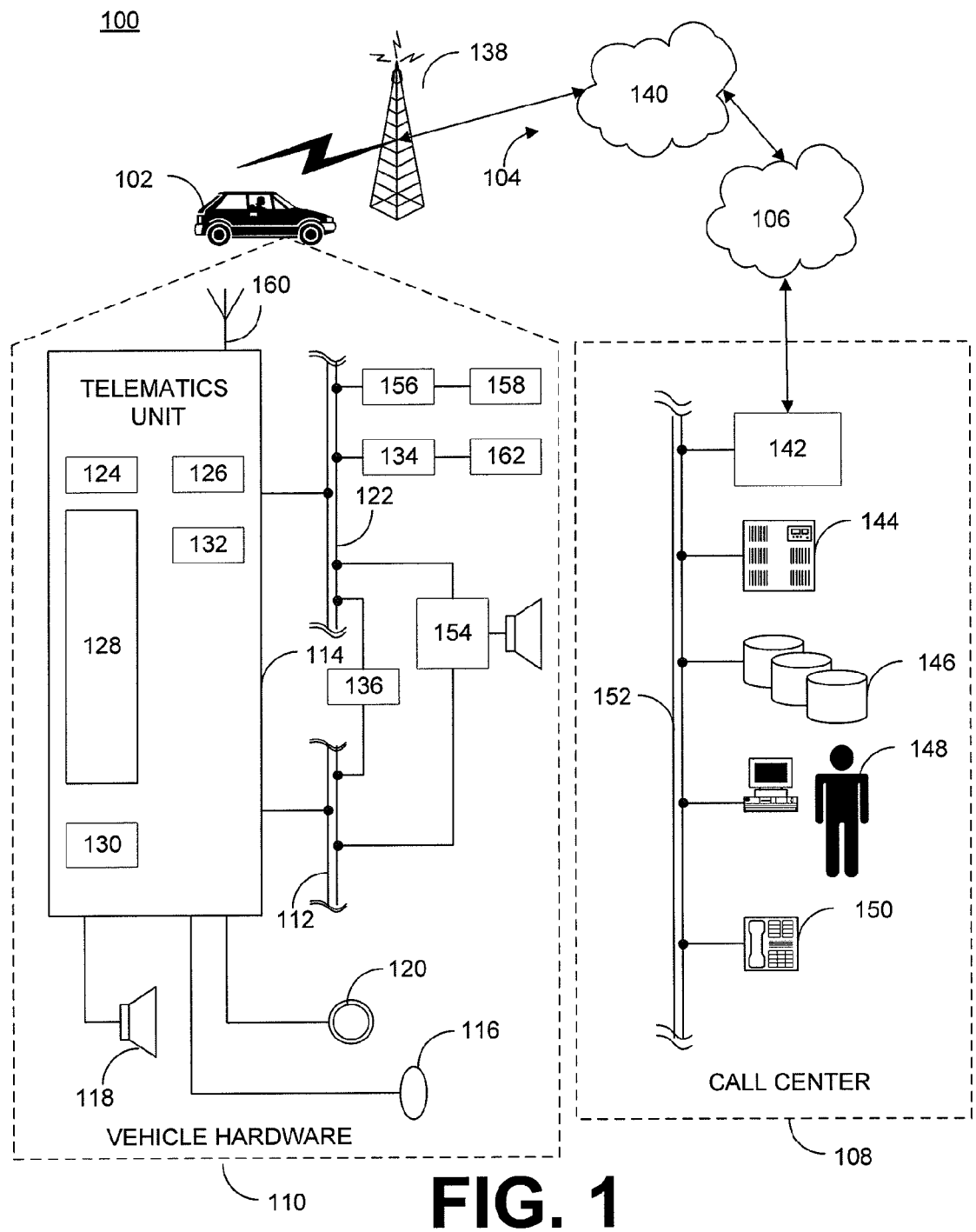
FIG. 1 is a schematic view of an exemplary communication system within which examples of the disclosed system may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RY), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128, one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various accident and or collision sensor interface modules 156 and sensors 158 located throughout the vehicle, infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle accident and/or collision detection sensor interface 156 are operatively connected to the vehicle bus 122. The accident sensors 158 provide information to the telematics unit via the accident and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to mention but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local area networks (WLANs) or networks providing broadband wireless access (BWA), or any combination thereof.

Call Center (OCC) 108 is designed to provide the vehicle hardware 10 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Further aspects of the invention include a method and system for restoring connectivity from a telematics service provider to a desubscribed telematics unit, and therefore, providing telematics services to a vehicle owner. The telematics unit contains a cellular telephone which is used by the telematics service provider to deliver telematics services to the vehicle owner across a wireless communication network. The cellular telephone within the telematics unit is assigned a Mobile Identification Number (MIN) that enables it to communicate with the telematics service provider. However, after a vehicle owner's telematics service subscription lapses, the telematics service provider desubscribes the vehicle owner's telematics unit by deactivating the MIN of the telematics unit. As noted above, the burden of maintaining an active MIN in every desubscribed telematics unit, across many vehicles, would be substantial. Thus, deactivating the MIN in a desubscribed telematics unit reduces operation costs.

However, a vehicle owner associated with a desubscribed telematics unit may occasionally have a need to request certain telematics services from the telematics service provider. Exemplary services include emergency unlocking of the vehicle door after misplacing vehicle keys, dispatching emergency personnel to the vehicle location after being involved in an accident, or requesting turn-by-turn direction when lost. Aspects of the invention provide for a vehicle owner with a lapsed telematics service subscription and a desubscribed telematics unit in his vehicle to request certain "a la carte" services from a telematics service provider using the vehicle owner's personal cellular telephone connected to the desubscribed telematics unit across a personal wireless link.

Figure 2:
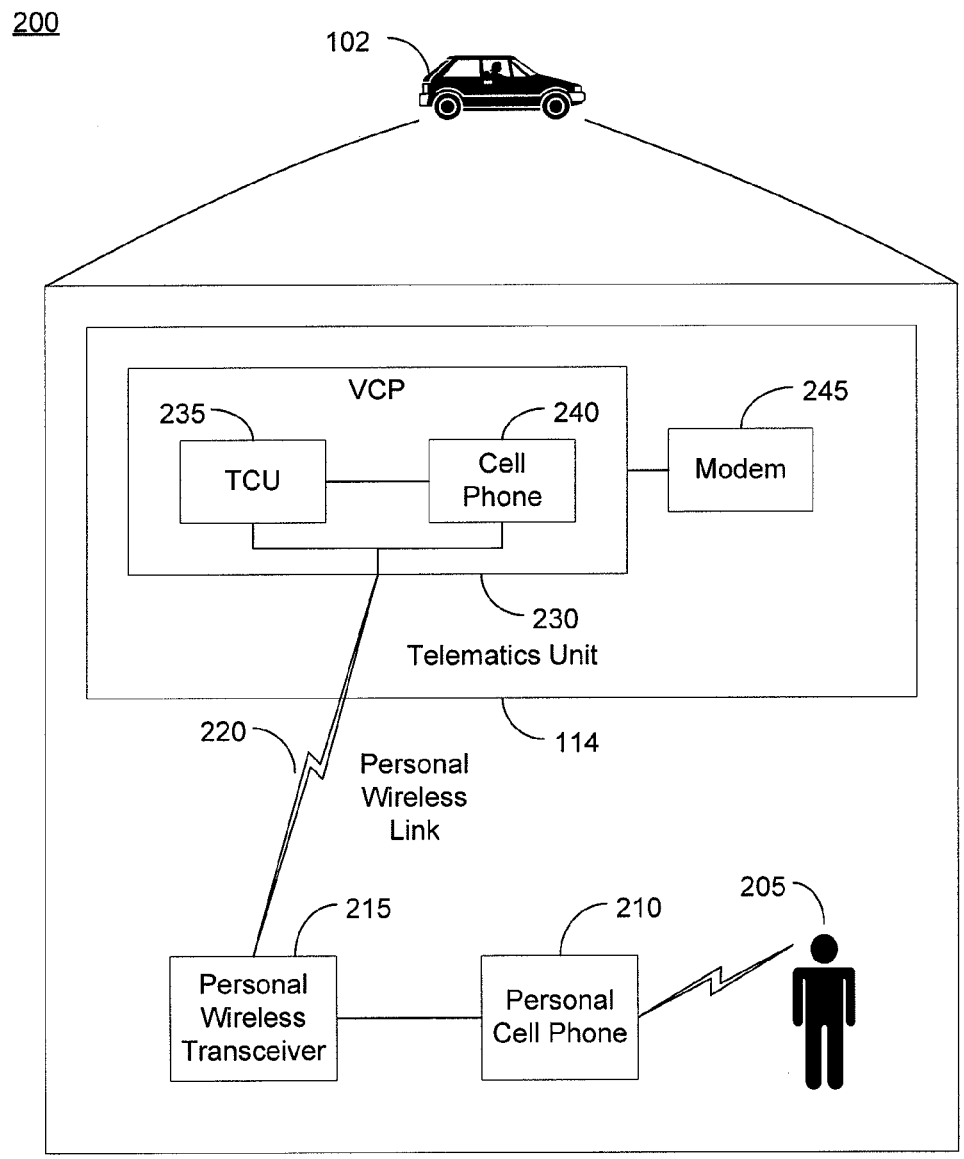
FIG. 2 is a schematic view of an exemplary system for restoring connectivity to a desubscribed telematics unit.

FIG. 2 is a schematic view of an exemplary system for restoring connectivity to a desubscribed telematics unit. An in-vehicle hardware module referred to as a vehicle communication processor (VCP) 230 enables the telematics unit 114 to communicate with a telematics service provider. The VCP includes telematics communication unit (TCU) 235 and a cellular telephone 240 with an ordinarily active cellular telephone number or Mobile Identification Number (MIN). The cellular telephone may be analogous to the cellular telephone components 124 shown and described in FIG. 1. The telematics unit 114 may also include a modem 245 analogous to the modem 126 shown and described in FIG. 1.

As noted above, the disclosed system allows a vehicle owner with a desubscribed telematics unit installed in his vehicle to reestablish connectivity to the telematics service provider and purchase "a la carte" telematics services and/or renew his or her subscription. Restoring connectivity to the telematics service provider is accomplished in one example of the invention by utilizing a personal wireless communication link 220 between the vehicle owner's 205 personal cellular telephone 210 and the TCU 235. The personal wireless link 220 may be between a personal wireless transceiver 215 connected to, part of or otherwise associated with, the personal cellular telephone 210 and the TCU 235. The TCU 235 may also have a personal wireless transceiver integrated within it.

In accordance with other alternative aspects of the invention, a personal wireless transceiver 215 is integrated with the personal cellular telephone 210. The personal wireless link may be enabled by a wireless protocol for exchanging data over short distances from one or more stationary or mobile devices, e.g., Bluetooth™, WiFi, and WiMAX.

Figure 3:
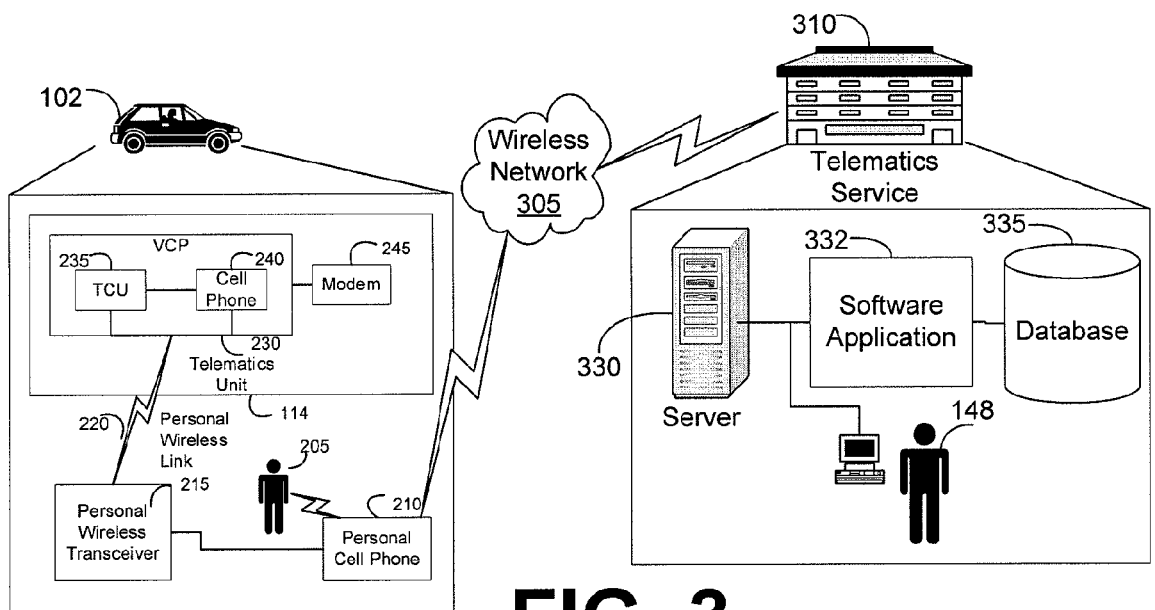
FIG. 3 is a schematic view of another exemplary system for restoring connectivity to a desubscribed telematics unit.

FIG. 3 is a larger schematic view of the exemplary environment for restoring connectivity to a desubscribed telematics unit. A vehicle owner 205 with a desubscribed telematics unit in his vehicle 102 may restore connectivity to the telematics service provider 310 through the vehicle owner's 205 personal cellular telephone 210 and a personal wireless link 220 within the vehicle 102. After enabling the personal wireless link 220 between the personal cellular telephone 210 and the telematics unit 114, the telematics unit 114 may communicate with the telematics service provider 310 over personal wireless link 220, personal cellular telephone 210, and wireless network 305.

After restoring connectivity to the telematics service provider 310, the vehicle owner 205 may request and purchase "a la carte" telematics services supported by the telematics service provider 310. These services may include emergency door unlock of the vehicle 102, requesting emergency personnel to an accident scene, or requesting turn-by-turn directions from a live advisor. The one or more computer servers 330, residing on the telematics service provider's premises may execute one or more software applications 332, or may store and access information from one or more databases 335, to provide the requested "a la carte" services. The one or more computer servers 330 are connected to the one or more databases 335 via a computer network. Further, a live advisor 148 may access the servers 330, software applications 332, and databases 335 to provide the requested "a la carte" services using a personal computer. For example, a vehicle owner 205 may restore connectivity to a telematics service provider 310 to request turn-by-turn directions.

In response to this request, a live advisor 148 may access the turn-by-turn directions from the one or more databases 335 using at least one of the one or more computer servers 330 and/or at least one or more software applications 332. Thereafter, the live advisor 148 may provide the turn-by-turn directions to the vehicle owner 205 through the telematics unit 114 via wireless network 305, personal wireless link 220 and personal cellular telephone 210. Data may be transferred, for example, from the telematics service provider 310 to the personal cellular phone 210 via 1XRTT protocol. The data, for example, once received at the personal cellular phone 210 may be transferred to the telematics unit 114 via Bluetooth Serial Port Protocol. Data may include, for example, commands to lock or unlock the vehicle doors.

Figure 4:
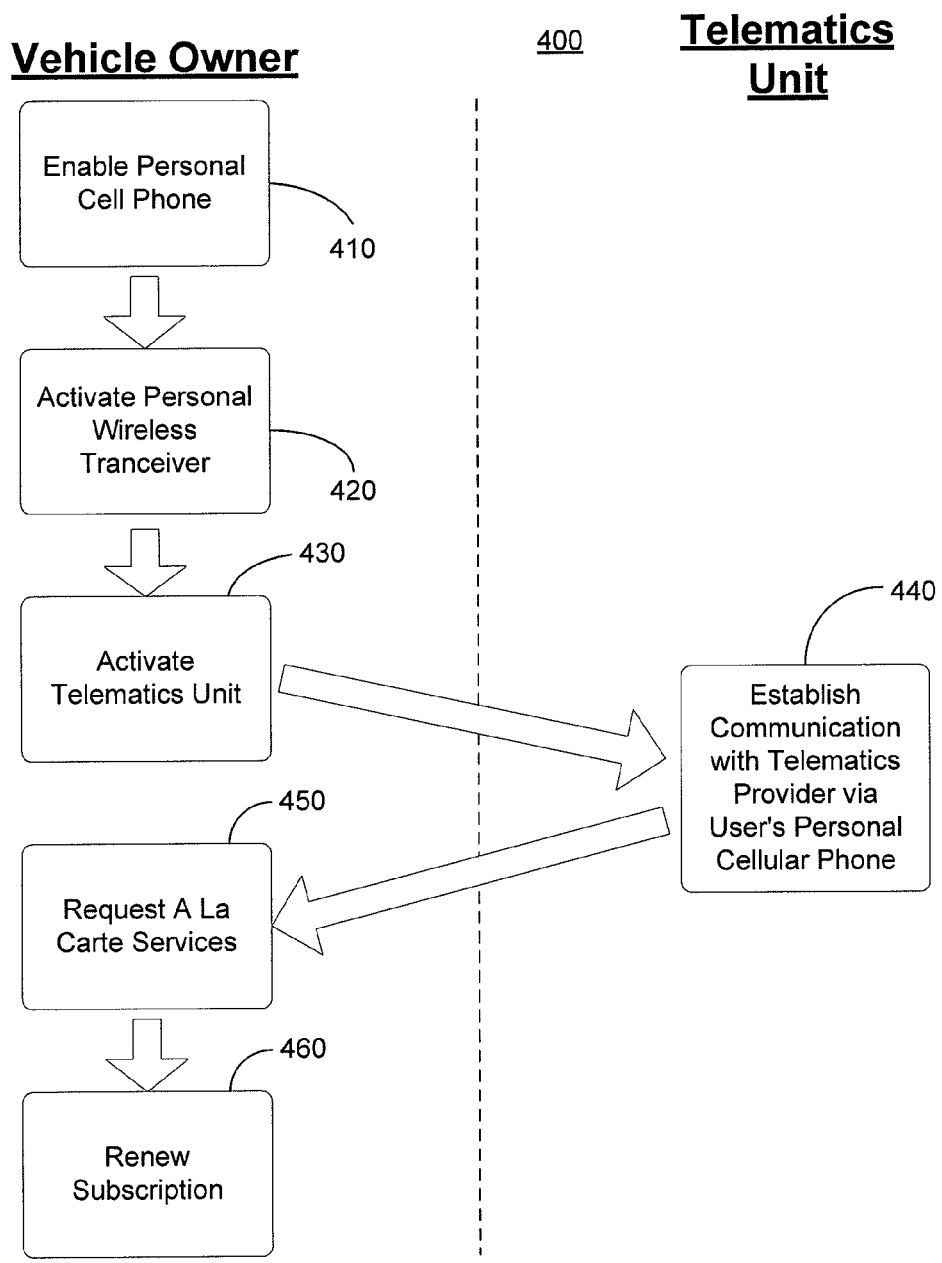
FIG. 4 is a flow diagram that illustrates an exemplary method for restoring connectivity to a desubscribed telematics unit.

FIG. 4 is a flow diagram that illustrates an exemplary method for restoring connectivity to a desubscribed telematics unit. The exemplary method shown in FIG. 4 shows steps that are performed by a vehicle owner (actions illustrated on the left side of the figure) and by the telematics unit (actions illustrated on the right side of the figure). At step 410, a vehicle owner enables his or her personal cellular telephone. At step 420, the vehicle owner activates a personal wireless transceiver. At step 430, the vehicle owner activates the desubscribed telematics unit in his vehicle. For example, a user may press one of the buttons 120 to activate the desubscribed telematics unit (the button push being a prompting event).

After activating the telematics unit and a personal wireless transceiver, the telematics unit establishes a personal wireless link at stage 440 between the vehicle owner's personal cellular telephone and the telematics unit as shown and described in FIG. 2. The personal wireless link may be enabled by a wireless protocol for exchanging data over short distances from one or more stationary or mobile devices such as Bluetooth™, WiFi, or WiMAX. The vehicle owner's personal cellular telephone, controlled by the telematics unit, is then used to dial the telematics service provider. To enable this, a phone number of the telematics service provider embedded in the telematics unit is transferred to the owner's personal cellular telephone, which is then used to dial the telematics service center. At this state, the user is in communication with the telematics service center to request a la carte services or reactivate the telematics unit.

The vehicle owner (or telematics user, subscriber, etc.) may then request "a la carte" services from the telematics service provider at stage 450 using his personal cellular telephone 210. "A la carte" services may include emergency unlocking of the door of the vehicle, the summoning of emergency personnel to an accident scene, the provision of turn-by-turn directions from a live advisor, etc. At step 460, the vehicle owner may optionally request to renew his or her lapsed subscription, so as to be able to receive additional telematics services. Renewing a subscription may involve reactivating the cellular telephone within the telematics unit, which may include installing or activating a MIN on the telematics unit's cellular telephone.

It will be appreciated that a novel and useful method and system for providing and/or restoring connectivity to a desubscribed telematics unit have been described herein. In this description, all references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for providing a la carte telematics services through a desubscribed telematics unit, the a la carte telematics services comprising unlocking of a vehicle door, dispatching of emergency personnel, and provision of turn-by-turn directions, the system comprising:
    a telematics communications unit within the desubscribed telematics unit, configured to:
        activate a personal wireless link between the desubscribed telematics unit and a personal cellular telephone external to the telematics unit;
        establish connectivity between a cellular component of the desubscribed telematics unit and a telematics services provider; and
        send a request for one or more a la carte telematics services received from the personal cellular telephone to the telematics service provider;
    a call center of the telematics service provider, configured to:
        receive the request for the one or more a la carte telematics services; and
        provide one or more of the requested a la carte telematics services via the connection between the telematics service provider and the cellular component of the desubscribed telematics unit and via the personal wireless link between the desubscribed telematics unit and the personal cellular telephone without an active subscription for telematics services for the desubscribed telematics unit.

2. The system according to claim 1, the system further comprising:
    a personal wireless transceiver associated with the personal cellular telephone.

3. The system according to claim 2, wherein the personal wireless transceiver is integrated into the personal cellular telephone.

4. The system according to claim 1, wherein the personal wireless link is enabled by a short-range wireless protocol for exchanging data between devices.

5. The system according to claim 4, wherein the wireless protocol is selected from the group consisting of Bluetooth™, WiFi, and WiMAX.

6. The system according to claim 1, further comprising:
    a computer network;
    at least one database connected to the at least one computer server across the computer network; and
    at least one software application running on the at least one computer server for providing telematics services to the telematics unit, wherein the at least one computer server accesses and stores information into the at least one database using the at least one software application.

7. A method for providing a la carte telematics services through a desubscribed telematics unit, the a la carte telematics services comprising unlocking of a vehicle door, dispatching of emergency personnel, and provision of turn-by-turn directions, the method comprising:
    activating a personal wireless link between the desubscribed telematics unit and a personal cellular telephone external to the telematics unit;
    establishing connectivity between a cellular component of the desubscribed telematics unit and a telematics service provider;
    sending a request for one or more a la carte telematics services received from the personal cellular telephone to the telematics service provider; and
    providing one or more of the requested a la carte telematics services from the telematics service provider via the connection between the telematics service provider and the cellular component of the desubscribed telematics unit and via the personal wireless link between the desubscribed telematics unit and the personal cellular telephone without an active subscription for telematics services for the desubscribed telematics unit.

8. The method according to claim 7, wherein the personal wireless link is enabled by a short-range wireless protocol for exchanging data from one or more devices.

9. The method according to claim 8, wherein the wireless protocol selected from the group consisting of Bluetooth™, WiFi, and WiMAX.

10. A non-transitory computer-readable medium having thereon computer-executable instructions for providing a la carte telematics services through a desubcribed telematics unit, the a la carte telematics services comprising unlocking of a vehicle door, dispatching of emergency personnel, and provision of turn-by-turn directions, the non-transitory computer-readable medium comprising computer-executable instructions for:

activating a personal wireless link between the desubscribed telematics unit and a personal cellular telephone external to the telematics unit;

establishing connectivity between a cellular component of the desubscribed telematics unit and a telematics service provider;

sending a request for one or more a la carte telematics services received from the personal cellular telephone to the telematics service provider; and providing one or more of the requested a la carte telematics services from the telematics service provider via the connection between the telematics service provider and the cellular component of the desubscribed telematics unit and via the personal wireless link between the desubscribed telematics unit and the personal cellular telephone without an active subscription for telematics services for the desubscribed telematics unit.

11. The non-transitory computer-readable medium according to claim 10, wherein the personal wireless link is enabled by a short-range wireless protocol for exchanging data from one or more devices.

12. The non-transitory computer-readable medium according to claim 11, wherein the wireless protocol is selected from the group consisting of Bluetooth™, WiFi, and WiMAX.

\* \* \* \* \*